United States Patent
Furlong et al.

(10) Patent No.: US 6,822,648 B2
(45) Date of Patent: Nov. 23, 2004

(54) METHOD FOR OCCLUSION OF MOVABLE OBJECTS AND PEOPLE IN AUGMENTED REALITY SCENES

(75) Inventors: Todd Joseph Furlong, Goffstown, NH (US); John Franklin Ebersole, Jr., Bedford, NH (US); John Franklin Walker, W. Dundee, IL (US); John Franklin Ebersole, Bedford, NH (US)

(73) Assignee: Information Decision Technologies, LLC, Bedford, NH (US)

( * ) Notice: Subject to any disclaimer, the term of this patent is extended or adjusted under 35 U.S.C. 154(b) by 245 days.

(21) Appl. No.: 10/123,364

(22) Filed: Apr. 16, 2002

(65) Prior Publication Data

US 2002/0149581 A1 Oct. 17, 2002

Related U.S. Application Data

(60) Provisional application No. 60/284,315, filed on Apr. 17, 2001.

(51) Int. Cl.$^7$ .............................................. G06T 15/40
(52) U.S. Cl. .................................................... 345/421
(58) Field of Search ................................ 345/419, 473, 345/474, 420, 421, 427, 706, 757

(56) References Cited

U.S. PATENT DOCUMENTS 4,616,262 A * 10/1986 Toriumi et al. ............. 348/597
5,424,556 A * 6/1995 Symosek et al. ......... 250/559.32
5,977,987 A * 11/1999 Duluk, Jr. ................... 345/441
6,259,452 B1 * 7/2001 Coorg et al. ................ 345/421
6,556,201 B1 * 4/2003 Maehara et al. ............ 345/427
6,624,853 B1 * 9/2003 Latypov ..................... 348/722

* cited by examiner

*Primary Examiner*—Mark Zimmerman
*Assistant Examiner*—Enrique L Santiago
(74) *Attorney, Agent, or Firm*—Brian M. Dingman, Esq.; Mirick, O'Connell, DeMallie & Lougee, LLP

(57) ABSTRACT

The purpose of the invention is to create a method to allow a real person or movable physical object to occlude virtual objects in a augmented reality application using a single tracking data sensor for objects or only head tracking data for a real person. The method involves occluding virtual objects with a real world human in augmented reality. The method comprises creating an orthogonal plane billboard with soft texture edges representing a user's head; creating an orthogonal plane billboard with soft texture edges representing a user's torso; positioning and orienting the head billboard using motion tracker data; positioning and orienting the torso billboard relative to the head billboard; displaying the head and torso billboards in real-time 3-D to correspond to the location of a real person; and mixing the resulting image with a live image of a real person.

16 Claims, 3 Drawing Sheets

METHOD FOR OCCLUSION OF MOVABLE OBJECTS AND PEOPLE IN AUGMENTED REALITY SCENES

CROSS REFERENCE TO RELATED APPLICATIONS

This application claims priority of Provisional patent application 60/284,315 filed Apr. 17, 2001, and is a Continuation in Part of "Augmented Reality-Based Firefighter Training System and Method" Ser. No. 09/525,983 filed Mar. 15, 2000.

GOVERNMENT RIGHTS

This invention was made with Government support under Contract Number N61339-01C-1008 awarded by the Department of the Navy. The Government has certain rights in the invention.

FIELD OF THE INVENTION

This invention relates to computer graphics, augmented reality, and mixed reality. It defines a way to simulate the occlusion of virtual objects by a real person and/or other moveable objects in an augmented reality graphical application.

COPYRIGHT INFORMATION

A portion of the disclosure of this patent document contains material that is subject to copyright protection. The copyright owner has no objection to the facsimile reproduction by anyone of the patent document or the patent disclosure, as it appears in the Patent and Trademark Office records but otherwise reserves all copyright works whatsoever.

BACKGROUND OF THE INVENTION

In augmented reality, in order to improve realism, it is necessary for real objects to occlude virtual objects. To do this, virtual models of such real objects must be created that correspond in space and time to the location of the real objects. One problem with traditional modeling techniques is that hard edges introduced by polygonal models can be distracting if there is misregistration in augmented reality due to tracking errors and lag.

SUMMARY OF THE INVENTION

The purpose of the invention is to create a method to allow a real person or movable physical object to occlude virtual objects in an augmented reality application using a single tracking data sensor for both human and non-human objects. The invention comprises an orthogonal plane billboarding technique that allows textures with fuzzy edges to be used to convey the sense of a soft-edged 3D model in the space. This is done by creating three orthogonal (perpendicular) planes. A texture map is mapped onto each of these planes, consisting of profile views of the object of interest as silhouettes of how they look from each of these directions. One application for this orthogonal plane billboard is the modeling of a human head and torso.

DETAILED DESCRIPTION OF THE PREFERRED EMBODIMENTS OF THE INVENTION

In the invention, texture maps representing the movable object are mapped onto three orthogonal planes. A tracking sensor is used to determine the actual position and orientation of the object, as appropriate. When the viewer's viewpoint is perpendicular to a plane, the texture map is opaque. When the viewpoint is parallel to the plane, the texture map is transparent. The texture map is faded between these two extremes as the orientation changes between these two extremes, to accomplish a desirable graphical mixing result that matches the silhouette of the object (or human) while maintaining a softer border around the edge of the silhouette contained in the texture map. The appearance of a soft ("fuzzy") border is made by fading to transparent the edges of the object silhouette in the texture map.

Figure 1:
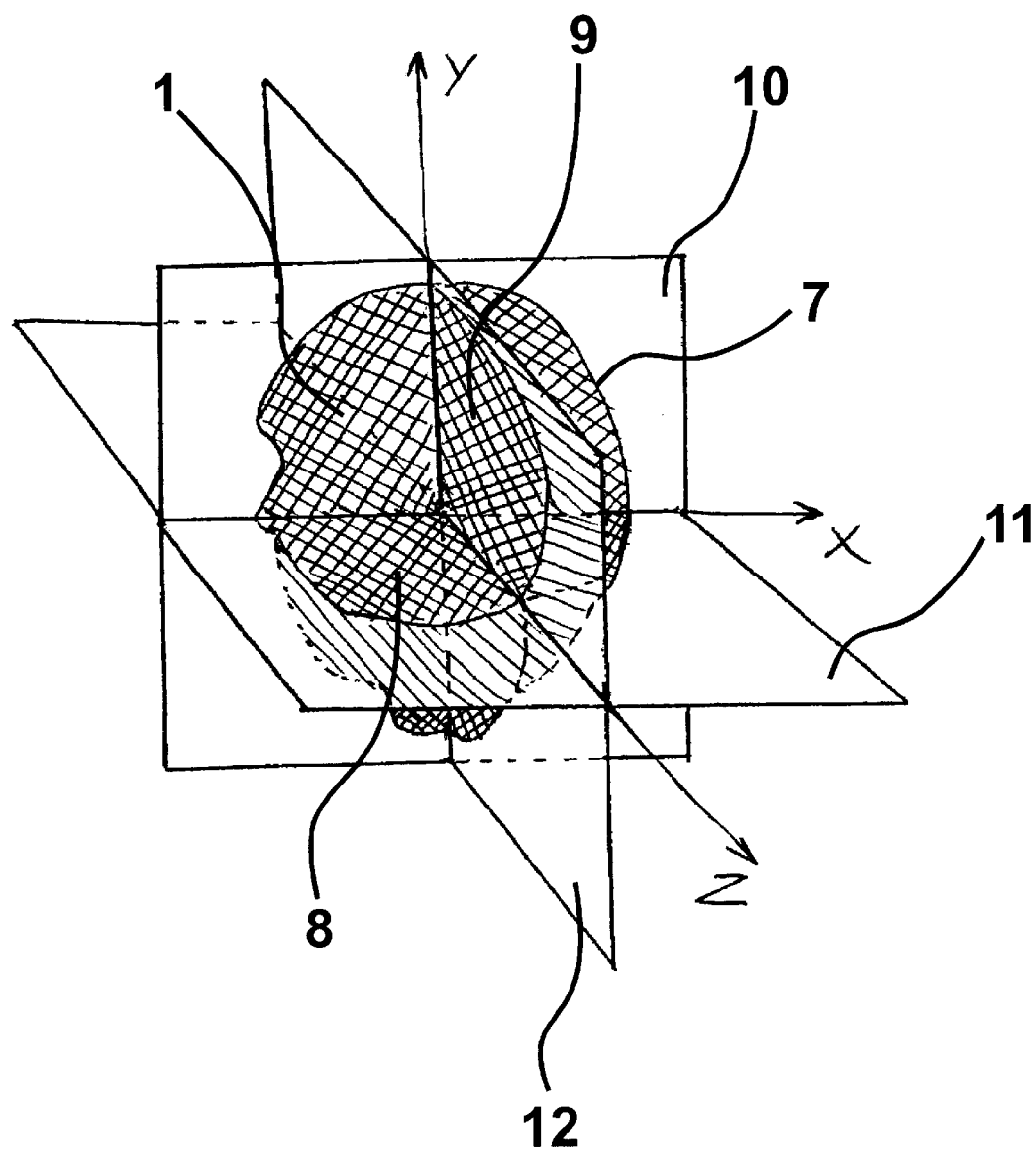
FIG. 1 is a diagram of the three orthogonal planes that contain the three texture mapped images of a human head, useful in understanding the invention.

In the preferred embodiment, as shown in FIG. 1, a series of three texture maps containing silhouettes 1, 8, and 9 (in this case of a human head, from the side, top, and front, respectively) are shown mapped onto each of three orthogonal planes 10, 11 and 12, respectively. The texture maps may fade to transparent at their edges for a fuzzy appearance to the shape. The orthogonal planes are each broken up into 4 quadrants defined by the intersection of the planes, and the 12 resulting quadrants are rendered from back to front for correct alpha blending in OpenGL of the texture maps and planes, with depth buffering enabled. When a plane is perpendicular to the view plane of a virtual viewpoint looking at the object, the plane is rendered to be completely transparent. A linear fade is used to completely fade the texture map to completely opaque when the plane is parallel to the view plane. This fade from opaque to transparent as the planes are turned relative to a viewer is responsible for the large part of the desirable fuzzy appearance to the shape. The texture maps used to shade the three planes were created from a digital image of a person, then made into grayscale silhouettes, and so match the silhouette of a human user very well. The edges 7 of the human silhouettes in the texture maps were blurred so that they would fade linearly from solid white (which represents the silhouette) to solid black (which represents non-silhouette portions of the texture map) to look better in an augmented reality situation where a little bit of a fuzzy edge is desirable. This fuzzy edge spans what is equivalently approximately 0.5 inches in real distance.

Figure 2:
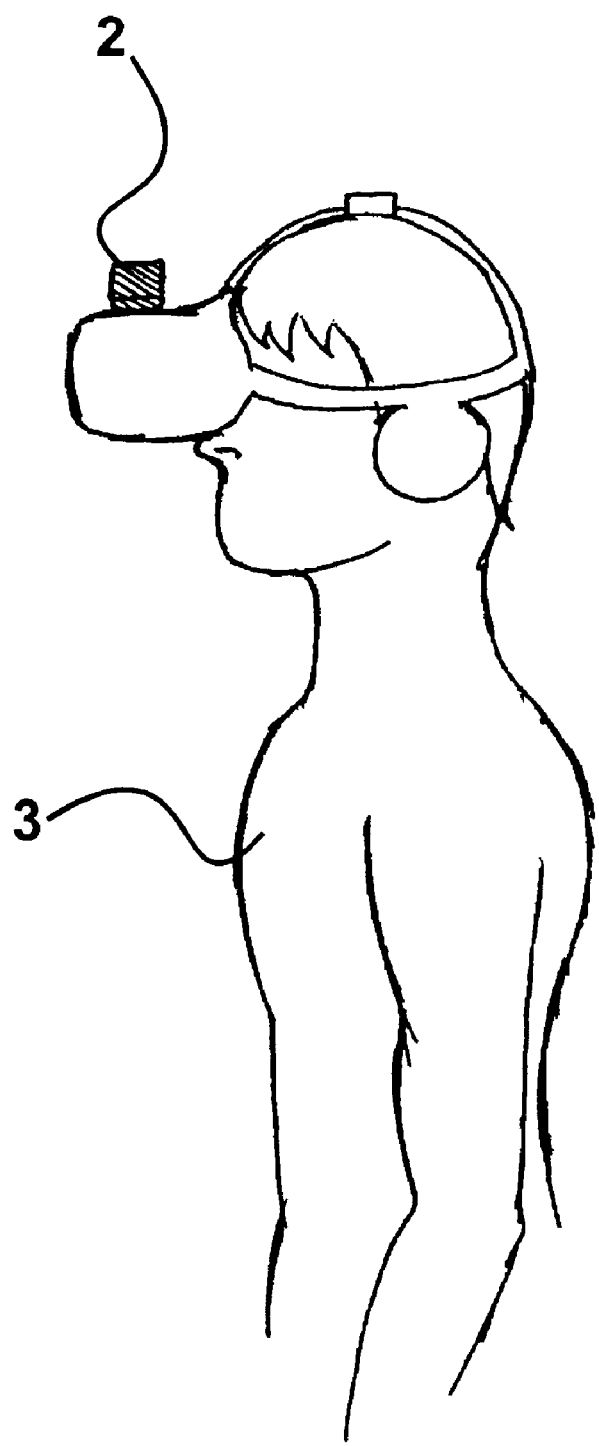
FIG. 2 is a diagram of a human head and torso, which will be compared to graphical components in FIG. 3.

FIG. 2 depicts a diagram of a human 3 wearing a head tracker 2 on a head mounted display. The virtual representation of human 3 is shown used in the inventive technique in FIG. 3. Item 2 in FIG. 2 is a motion tracker, in this case a six-degree-of-freedom motion tracker that measures the head location and orientation. The position and orientation information from tracker 2 can be applied to orthogonal plane billboards.

Figure 3:
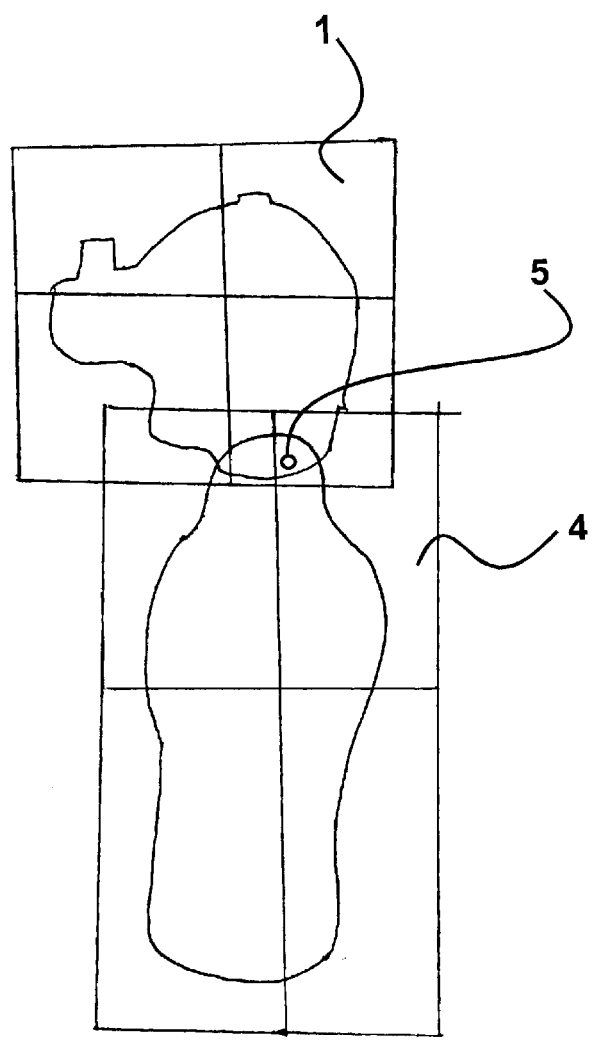
FIG. 3 is a diagram of two sets of orthogonal planes, along with the joint between the two sets, for the human head and torso of FIG. 2.

If the object being depicted has a pivot point, such as pivot point 5 in FIG. 3 for a human neck-torso joint, an orthogonal plane billboard torso 4 can be created in approximately the correct place relative to the joint. The torso in this instance may be designed to remain upright, only rotating about a vertical axis. The head in this instance has full 6 degree-of-freedom motion capability based on the data coming from the tracker worn on the head of the user. This allows the head orthogonal plane billboard to be lined up correspondingly with the user's head. The torso orthogonal plane billboard is attached to the pivot point 5 and is placed "hanging" straight down from that point, and has 4 degrees of freedom: three to control its position in space, and one controlling the horizontal orientation.

The head and torso models, when lined up to a real human, occlude computer-generated graphics in a scene. If augmented reality video mixing is achieved with a luminance key to combine live and virtual images, white head and torso models will mask out a portion of a computer-generated image for replacement with a live video image of the real world. This invention can be applied to any real world movable objects for which an occlusion model may be needed.

The above technique is also applicable to a movable non-person real world object. If the non-person object has no joints, then such an implementation is simpler since the complexity of coupling the separate head and torso models is avoided. The technique for the single movable real-world physical object is functionally identical to the above method when only the head model is used.

Although specific features of the invention are shown in the drawing and not others, this is for convenience only, as each feature may be combined with any or all of the other features in accordance with the invention.

Other embodiments that will occur to those skilled in the art are within the following claims.

What is claimed is:

1. A method of occluding virtual objects with a real world human in augmented reality comprising:

a. Creating a set of three orthogonal planes that are texture-mapped with soft texture edges representing a user's head;

b. Creating a set of three orthogonal planes that are texture-mapped with soft texture edges representing a user's torso;

c. Positioning and orienting the set of three orthogonal planes representing the user's head using motion tracker data;

d. Positioning and orienting the set of three orthogonal planes representing the user's torso relative to the set of three orthogonal planes representing the user's head;

e. Displaying the two sets of three orthogonal planes each representing the user's head and torso in real-time 3-D to correspond to the location of a real person; and f. Mixing the resulting image with a live image of a real person.

2. A method of occluding virtual objects with a movable real-world physical object in augmented reality comprising:

a. Creating at least one set of three orthogonal planes that are texture-manned with soft texture edges representing the object;

b. Positioning and orienting the at least one set of three orthogonal planes that represent the object using motion tracker data;

c. Displaying the at least one set of three orthogonal planes that represent the object in real-time 3-D to correspond to the location of the object; and d. Mixing the resulting image with a live image of the real object.

3. The method of claim 2 in which the movable real world physical object has a joint connecting two parts, one part of which is tracked and the other part of which is connected to the first part by a joint but which is not separately tracked.

4. The method of claim 3 in which the movable real world physical object is a human with a head and a torso.

5. The method of claim 4 in which the head is tracked.

6. The method of claim 2 in which the texture maps fade to transparent at their edges.

7. The method of claim 2 in which at least one set of three orthogonal planes define twelve quadrants bounded by the intersections of the planes.

8. The method of claim 7 in which the texture maps in each quadrant are rendered from back to front.

9. The method of claim 8 in which the texture maps are rendered with depth buffering.

10. The method of claim 2 in which the planes are displayed relative to a view plane of a virtual viewpoint looking at the object.

11. The method of claim 10 in which a plane is rendered to be transparent when it is perpendicular to the view plane of the virtual viewpoint.

12. The method of claim 11 in which the texture map of a plane that is parallel to the view plane of the virtual viewpoint is rendered as opaque.

13. The method of claim 12 in which a linear fade is used to fade the texture map between transparent and opaque as the plane is turned relative to the view plane of the virtual viewpoint.

14. The method of claim 2 in which the edges of the texture maps are blurred.

15. The method of claim 14 in which the blurring comprises a linear fading from solid white to solid black.

16. The method of claim 14 in which the blurring spans what is equivalently approximately one-half inch in real distance.

* * * * *